United States Patent [19]

Hartford

[11] 4,103,000

[45] Jul. 25, 1978

[54] METHOD FOR PREPARING COPPER ARSENATE COMPOSITIONS

[75] Inventor: Winslow H. Hartford, Charlotte, N.C.

[73] Assignee: Koppers Company, Inc., Pittsburgh, Pa.

[21] Appl. No.: 472,535

[22] Filed: May 23, 1974

Related U.S. Application Data

[63] Continuation of Ser. No. 331,126, Feb. 9, 1973, abandoned.

[51] Int. Cl.² ............................................. A01N 11/08
[52] U.S. Cl. ...................................... 424/133; 424/137; 424/140
[58] Field of Search ................................ 424/133, 137

[56] References Cited

U.S. PATENT DOCUMENTS

| | | | |
|---|---|---|---|
| 2,106,978 | 2/1938 | Kamesam | 424/137 |
| 2,388,496 | 11/1945 | Pearce et al. | 424/133 |
| 2,438,511 | 3/1948 | McMahon | 424/137 |
| 2,573,253 | 10/1951 | Farber | 424/133 |

OTHER PUBLICATIONS

Chemical Abstracts 43:2885(b), 1949.
Chemical Abstracts 44:472(g)–473(e).

*Primary Examiner*—Leonard Schenkman
*Attorney, Agent, or Firm*—Herbert J. Zeh, Jr.; Oscar B. Brumback

[57] ABSTRACT

The present invention is directed to copper arsenate compositions which are useful in preparing chromated copper arsenate wood preserving formulations. The copper arsenate compositions are slurries of insoluble copper arsenates in an aqueous solution of copper arsenates. The copper arsenate slurries have a mole ratio of $As_2O_5$ to CuO of from about 0.3:1 to about 0.9:1 and are readily soluble in chromic acid to form chromated copper arsenate solutions. The copper arsenate slurries are prepared by reacting copper metal with arsenic acid in the presence of an acid catalyst and an oxidizing agent.

4 Claims, No Drawings

METHOD FOR PREPARING COPPER ARSENATE COMPOSITIONS

This is a continuation of application Ser. No. 331,126, filed Feb. 9, 1973, now abandoned.

BACKGROUND OF THE INVENTION

This invention relates to copper arsenate slurry compositions which are useful in preparing chromated copper arsenate wood preserving formulations. More particularly, it relates to copper arsenate slurries having a molar ratio of $As_2O_5$ to CuO of from about 0.3:1 to about 0.9:1 and which are readily soluble in chromic acid. This invention also relates to a method for preparing the copper arsenate slurries from copper metal and arsenic acid.

During recent years the group of wood preservatives known as chromated copper arsenates (CCA compounds) have become of great importance. These CCA compositions are one of the most widely used type of wood preserving compounds in use today. These preservatives contain as active ingredients copper as cupric ion, chromium usually as the dichromate ion and arsenic as acid arsenate ion. In addition, the CCA compositions may also contain inert ions and salts such as sodium ion, sulfate ion, and/or sodium sulfate. These inert ions and salts are the side products which are formed when the CCA compositions are formulated from the least expensive source of active ingredients usually available; for example, copper sulfate as the copper source and sodium dichromate as the chromium source.

Typical formulations of some of the widely used CCA compositions of the prior art are as follows: Greensalt which is 56% $Na_2Cr_2O_7 . 2H_2O$ or $K_2Cr_2O_7$, 33% $CuSO_4 . 5H_2O$, 11% $As_2O_5 . 2H_2O$; Tanalith C which is 45% $Na_2Cr_2O_7 . 2H_2O$ or $K_2Cr_2O_7$, 35% $CuSO_4 . 5H_2O$, 20% $As_2O_5 . 2H_2O$; and Celcure A which is 40% $Na_2Cr_2O_7 . 2H_2O$ or $K_2Cr_2O_7$, 32% $CuSO_4 . 5H_2O$, 26% $As_2O_5 . 2H_2O$. In recent years, the American Wood Preservers Association (AWPA) has standardized the formulations of CCA compositions. The formulations have been converted for greater ease in specification into a uniform nomenclature based on the oxides $CrO_3$, CuO and $As_2O_5$. The currently adapted standardized American formulations have the following compositions in percent by weight:

|  | CCA-Type A | CCA-Type B | CCA-Type C |
|---|---|---|---|
| $CrO_3$,% | 65.5 | 35.3 | 47.5 |
| CuO% | 18.1 | 19.6 | 18.5 |
| $As_2O_5$% | 16.4 | 45.1 | 34.0 |

The formulations are used as solutions containing from about 45 to 75% active oxides in water.

While the CCA formulations have found widespread use in the art, they generally suffer from one or more drawbacks. For example, it is difficult to formulate the CCA compositions as dry powders, especially for use in the southern United States. The $CuSO_4 . 5H_2O$ readily gives up its water of hydration to the $As_2O_5 . 2H_2O$ or $Na_2Cr_2O_7 . 2H_2O$, forming a very heavy, almost unmanageable paste. Some improvement can be effected by using potassium dichromate instead of the sodium salt, but this compound is substantially more expensive. The responsibility for mixing the formulation is thus transferred in many cases to the individual woodtreating plant, which frequently does not possess the specialized technical equipment needed to prepare accurate working solutions of these toxic and irritating chemicals.

In addition, the presence of the inert salts which are formed make it impractical to ship a concentrated solution from a central distribution to a treating plant since the alkali metal sulfates are the least soluble salts in such a solution and they precipitate out at moderate concentrations. Moreover, the presence of these inert salts have a deleterious effect on some applications of the CCA formulations. As the applications of these preservatives increased, they found more and more use in the treatment of utility poles. For this use, the residual inert salts remaining in the wood after the fixation of the preservative has occurred are undesirable since they have a deleterious effect on the treated utility poles.

Because of the deleterious effect of the inert salts, compositions have been formulated which eliminate these inert salts. For example, see Hager, U.S. Pat. No. 2,432,007 Dec. 2, 1947) and McMahon, U.S. Pat. No. 2,438,511 (Mar. 30, 1948).

Ideally, the CCA formulations should be aqueous solutions free from alkali salts containing about 60% of active oxides, which are inexpensive to ship and convenient to use in the treating plants. Such concentrated solutions have been prepared and are currently available. They are readily prepared from copper hydroxide or basic copper carbonate, chromic acid (chromium trioxide) and arsenic acid. Unfortunately, copper hydroxide and copper carbonate are much more expensive than copper sulfate so that advantages and conveniences of a liquid concentrate free from inert salts are largely offset by increased costs.

Attempts have been made to circumvent this difficulty in the case of CCA-Type B, which has the highest arsenic acid content of any of the standard CCA formulations. In U.S. Pat. No. 2,565,175, Hager discloses the manufacture of a copper arsenate from copper sulfate and arsenic acid. This mixture is treated with a carefully measured amount of calcium hydroxide, which precipitates most of the sulfate as gypsum ($CaSO_4 . 2H_2O$). In order to avoid loss of arsenate through precipitation, a deficiency of calcium hydroxide is used, so the final copper arsenate may contain about 3% or so of the sulfate. This process for the manufacture of copper arsenate as an intermediate for the manufacture of chromated copper arsenate has several drawbacks.

First, this process is limited to the production of a copper arsenate in which the mole ratio of $As_2O_5$ to CuO is about 1:1, yielding a completely water soluble copper arsenate. These high mole ratios are typical of Type B CCA formulations and cannot be used for the manufacture of Type A or Type C products where the $As_2O_5$:CuO ratio is much lower. In addition, as in well known in the art, precipitated gypsum is a material which is very voluminous in nature and extremely difficult to filter and wash. Much of the economy effected by the use of the relatively inexpensive copper sulfate is lost through the expense of handling the precipitated gypsum.

It is, therefore, an object of this invention to provide a concentrated aqueous CCA formulation which does not contain any appreciable soluble inert ions or salts, which is inexpensive to make, convenient to use, and inexpensive to ship. It is also an object of this invention to provide copper arsenate compositions which may be mixed with chromic acid to form the CCA formulations having the properties described above. The copper arsenates of this invention are inexpensive, easy to prepare, react readily with chromic acid, contain a minimum amount of inert ingredients and are capable of being used to make all of the various CCA formulations. In addition, this invention has as an object a method of preparing the copper arsenate compositions from inexpensive and readily available starting materials.

SUMMARY OF THE INVENTION

The present invention provides a concentrated aqueous chromated copper arsenate composition which contains a minimum of soluble inert ingredients, is inexpensive to make, convenient to use, and inexpensive to ship. This invention also provides copper arsenates which can be used to make all of the various CCA formulations and which are inexpensive and easy to prepare and use. The invention also provides a method for preparing the copper arsenates.

As mentioned above, the present invention comprehends the manufacture of copper arsenate compositions suitable for combining with chromic acid in a known manner to yield any of the presently used CCA formulations. The copper arsenates are prepared from readily available and inexpensive feeds, namely copper metal and arsenic acid. Optionally, in place of arsenic acid, one may use arsenic trioxide and convert it into arsenic acid by any of the known procedures before reaction with the copper metal. The copper metal used need not be of high grade, but is preferably wire scrap, cementation copper, or other lower cost secondary metal. The presence of nickel, zinc, aluminum and most other common trace metals is not harmful to the process, but iron in excess of 1% should be avoided.

The manufacture of copper arsenates, in general, from these starting materials or similar starting materials is not new. For example, see German Pat. No. 523,031 issued Apr. 18, 1931, which discloses the reaction of copper wire with "soluble" $As_2O_3$ and air at about 180° C. The product of the German reference is an insoluble copper arsenate whereas the copper arsenates of the present invention are mixtures of soluble and insoluble arsenates. Moreover, the "soluble" arsenic trioxide specified in the German reference is a special and expensive raw material which is not readily available. In addition, see French Pat. No. 782,705 issued June 12, 1935 to Marcel Serciron which teaches the reaction of air, copper and arsenic trioxide (or arsenic acid) in the presence of ammonia. The product is identified as an insoluble copper arsenite or arsenate. The solution at the end of the reaction must contain tetramino copper ions and soluble arsenite or arsenate. However, the precipitate which must be completely in the arsenate state is not usable for the formulation of CCA preservatives. If the entire reaction mixture is to be employed, it must be distilled to remove the ammonia or else the final preservative will contain ammonium salts which are deleterious and undesirable.

The copper arsenate composition of this invention consists of both a solid phase and a solution phase. Each phase consists essentially of copper arsenate and the overall composition has a mole ratio of $As_2O_5$ to CuO of from about 0.3:1 to about 0.9:1.0. The copper arsenate compositions of this invention are slurries of water insoluble copper arsenates in aqueous solutions of soluble copper arsenates with the overall molar ratio of $As_2O_5$ to CuO being as described above and the slurries are soluble in chromic acid.

The copper arsenates which are of greatest interest in wood preservation have mole ratios of $As_2O_5$ to CuO as follows:

| Type | Mole Ratio $As_2O_5$/CuO | Approx. Integral Ratio | Nominal Formula |
|---|---|---|---|
| CCA-A | 0.311 | 1:3 | $Cu_3(AsO_4)_2$ |
| CCA-B | 0.800 | 4:5 | $Cu_5H_{14}(AsO_4)_8$ |
| CCA-C | 0.621 | 5:8 | $Cu_4H_7(AsO_4)_5$ |

Stable arsenates occurring in nature as the minerals cornwallite, olivenite, wagnerite and euchroite have $As_2O_5$/CuO ratios ranging from 0.20 to 0.30. Therefore, they are not applicable in the present invention. The copper arsenate compositions of this invention comprise both a soluble and insoluble portion having a molar ratio of $As_2O_5$ to CuO of from about 0.3 to about 0.9. These compositions have been demonstrated by a series of experiments in which copper was digested with arsenic acid at various mole ratios of $As_2O_5$/CuO. The results are shown in the following Table 1.

Table 1

| Batch | 1 | 2 | 3 | 4 | 5 | 6 | 7 |
|---|---|---|---|---|---|---|---|
| Nominal $\frac{As_2O_5}{CuO}$ ratio | 0.5 | 0.6 | 0.625 | 0.7 | 0.7 | 0.8 | 1.0 |
| Batch make-up: Cu Carbonate | 23.0 | 23.0 | 23.0 | 23.0 | 23.0 | 23.0 | 23.0 |
| $H_3AsO_4$, 75% | 30.7 | 36.8 | 38.3 | 43.0 | 43.0 | 49.1 | 61.4 |
| $H_2O$ | 46.0 | 45.5 | 45.00 | 44.4 | 44.4 | 39.5 | 69.00 |
| Analysis dry solid res: % Cu | 34.8 | 31.5 | 30.4 | 27.8 | 29.8 | 26.9 | 24.2 |
| % As | 31.7 | 33.0 | 33.1 | 34.2 | 33.7 | 34.2 | 38.0 |
| Analysis liquid phase % Cu | 0.6 | 1.4 | 0.9 | 0.5 | 0.3 | 1.5 | 2.0 |
| % As | 2.8 | 5.6 | 4.4 | 2.1 | 1.6 | 8.0 | 11.3 |
| pH liquid phase | 2.31 | 2.23 | 2.18 | 1.85 | 1.80 | 1.57 | 1.48 |
| Calc'd. % compn. of original mixture % CuO | 16.60 | 15.72 | 15.57 | 14.99 | 14.99 | 14.83 | 10.79 |
| % $As_2O_5$ | 18.76 | 21.28 | 21.94 | 23.30 | 23.72 | 26.79 | 24.57 |
| % $H_2O$ | 64.64 | 63.00 | 62.49 | 61.71 | 61.29 | 58.38 | 64.84 |
| Calc'd. $\frac{As_2O_5}{CuO}$ mole ratio | 0.3910 | 0.4686 | 0.4876 | 0.5378 | 0.5475 | 0.6254 | 0.7818 |
| Calc'd. % compn. of solids % CuO | 35.67 | 32.84 | 32.13 | 29.91 | 31.44 | 29.32 | 25.65 |
| (adjusted to 25% total water) % $As_2O_5$ | 39.33 | 42.16 | 42.87 | 45.09 | 43.56 | 45.68 | 49.35 |
| % $H_2O$ | 25.00 | 25.00 | 25.00 | 25.00 | 25.00 | 25.00 | 25.00 |
| $\frac{As_2O_5}{CuO}$ mole ratio in solids | 0.385 | 0.444 | 0.462 | 0.522 | 0.479 | 0.539 | 0.666 |
| Calc'd. % compn. of solution % CuO | 1.07 | 1.40 | 1.47 | 2.00 | 1.24 | 1.40 | 3.46 |
| % $As_2O_5$ | 1.64 | 2.89 | 3.13 | 3.71 | 4.67 | 5.86 | 10.25 |
| $\frac{As_2O_5}{CuO}$ mole ratio in solution | 0.531 | 0.714 | 0.737 | 0.642 | 1.303 | 1.449 | 1.025 |
| Wt. % solid phase (25% $H_2O$) | 43.53 | 43.61 | 43.88 | 43.46 | 43.74 | 45.81 | 28.59 |
| Wt. % liquid phase | 56.47 | 56.39 | 56.12 | 56.54 | 56.26 | 54.19 | 71.41 |
| % of CuO in solid | 93.6 | 91.1 | 90.6 | 86.7 | 91.7 | 90.6 | 67.9 |
| % of CuO in liquid | 6.4 | 8.9 | 9.4 | 13.3 | 8.3 | 9.4 | 32.1 |

| Batch | 1 | 2 | 3 | 4 | 5 | 6 | 7 |
|---|---|---|---|---|---|---|---|
| % of $As_2O_5$ in solid | 91.3 | 86.0 | 85.7 | 84.1 | 80.3 | 78.1 | 57.9 |
| % of $As_2O_5$ in liquid | 8.7 | 14.0 | 14.3 | 15.9 | 19.7 | 21.9 | 42.1 |

It can be seen that even at the lowest ratios of $As_2O_5$ to CuO, a substantial amount of the product is in solution and the solution is quite acidic in pH. As would be expected, as the mole ratio of $As_2O_5$ is increased, the percentage of material in solution increases. It would be expected that when the ratio reaches approximately 1.0 the entire copper arsenate composition will be soluble.

The copper arsenate slurries of the present invention are characterized by an $As_2O_5/CuO$ mole ratio of from about 0.3:1.0 to about 0.9:1.0 and contain both a water insoluble and water soluble portion. These copper arsenate slurries are not capable of being manufactured by any methods of the prior art. These slurries possess great usefulness as intermediates for the manufacture of chromated copper arsenate liquid concentrates which will meet all the present AWPA specifications and any formulations intermediate to the standard formulations. It has been established by experiment that addition of chromic acid in the appropriate amount to the copper arsenate slurries of the present invention results in a rapid and complete dissolution of the copper arsenates into concentrated aqueous CCA solutions.

As mentioned above, the slurries of our invention are not capable of being made by prior art methods. The thermodynamics of the system indicate that the reaction $$8Cu + 5As_2O_3 + 9O_2 + 7H_2O \rightarrow 2Cu_4H_7(AsO_4)5$$

(a typical copper arsenate of the invention) should proceed to completion. However, it has been found that the rate of reaction with ordinary available commercial materials is inordinately slow. It is also well known that the oxidation of copper proceeds more readily in acid solutions. Thus, in the manufacture of copper sulfate, the reaction $$Cu + H_2SO_4 + \tfrac{1}{2}O_2 \rightarrow CuSO_4 + H_2O$$

proceeds readily, the $Cu^{++}$ ions being active in setting up a mechanism $$Cu^{++} + Cu \rightarrow 2Cu^+$$

$$2Cu^+ + 2H^+ + \tfrac{1}{2}O_2 \rightarrow 2Cu^{++} + H_2O$$

This mechanism should be applicable to the reaction of copper metal in arsenic acid:

$$8Cu + 10H_3AsO_4 + 4O_2 \rightarrow 2Cu_4H_7(AsO_4)5 + 8H_2O$$

However, attempts to complete this reaction, even under forcing conditions with oxygen under pressure and high temperatures gave an incomplete conversion of the copper metal to copper arsenate.

The method of this invention comprises reacting copper metal with arsenic acid in the presence of a catalyst and an oxidizing agent. The catalyst is a strong acid such as $HNO_3$, HCl, $H_2SO_4$, etc. In addition to the acid catalyst, an oxidizing agent is employed. High pressure and oxygen may be used as the oxidizing agent. A combination of the acid catalyst with oxygen is the preferred method. The method of the invention comprises reacting copper metal with arsenic acid in a preselected ratio so that the resulting product will have the $As_2O_5/CuO$ ratios of from about 0.3 to about 0.9. The reaction is preferably run in the presence of a strong acid catalyst in combination with an oxidizing agent usually oxygen. Because nitric acid possesses oxidizing properties, it is the catalyst usually employed and may be used with or without oxygen.

The following examples illustrate the invention but should not be construed to limit the same.

EXAMPLE 1

First 38.2 grams of copper turnings were placed in a 3-neck flask equipped with an agitator, reflux condenser, dropping funnel and heating mantle. Then 141.8 grams of 75% arsenic acid were added and heating and agitation started. When the temperature reached 100° C., 35.6 grams of 70% $HNO_3$ were slowly added to the flask over a 4-hour period. Heating was continued for a total of 7 hours. At the end of this period, less than 1% of the copper was unreacted. (Tests on successive runs of this experiment showed 0.08, 0.36, and 0.9 percent unreacted copper.) The product was a light blue slurry completely soluble in chromic acid. Then 123 grams of chromic acid ($CrO_3$) and 117 grams of water were added to the copper arsenate slurry. The result was a brown solution weighing 430 gms. and having a composition corresponding to a 60% liquid concentrate of CCA-Type C.

EXAMPLE 2

First 38.2 grams of copper turnings were placed in a 3neck flask equipped with an agitator, reflux condenser, dropping funnel, fritted glass sparger, and heating mantle. Then 141.8 grams of 75% arsenic were added and heating and agitation started. Oxygen was bubbled into the mixture through the sparger and 8.0 grams of 70% $HNO_3$ were added dropwise to the flask over a 4-hour period while maintaining the temperature at 100° C. Heating, agitation and oxygen addition were continued for a period of 4 additional hours. At the end of this time, the copper was completely reacted and a slurry of insoluble copper arsenate in a solution of copper arsenate was obtained. Then 245 grams of a 50% aqueous $CrO_3$ solution was added and the result was a 59% liquid solution of CCA-Type C.

EXAMPLE 3

This example illustrates the need for an acid to complete the reaction. First 19.1 grams of copper turnings and 70.9 grams of arsenic acid were placed in a rocking autoclave. The reaction was then run under an oxygen atmosphere at 100 lb. pressure and a temperature of 200° C. At the end of 7 hours, the copper was incompletely reacted and was covered with an oxide coating. The copper arsenate slurry of this invention was not present.

EXAMPLE 4

First 38.2 grams of copper turnings were placed in a 3neck flask equipped with an agitator, reflux condenser, dropping funnel and heating mantle. Then 182.5 grams of 75% arsenic acid were added and heating and agitation started. When the temperature reached 100° C., 35.6 grams of 70% $HNO_3$ were slowly added to the flask over a 4-hour period. Heating was continued for a total of 7 hours. At the end of this period, the copper was completely reacted and a slurry of copper arsenate was produced. The slurry was then mixed with a chromic acid solution to give a CCA-Type B formulation.

EXAMPLE 5

First 38.2 grams of copper turnings were placed in a 3neck flask equipped with an agitator, reflux condenser, dropping funnel, fritted glass sparger, and heating mantle. Then 182.5 grams of 75% arsenic acid were added and heating and agitation started. Oxygen was bubbled into the mixture through the sparger and 8.0 grams of 70% $HNO_3$ were added dropwise to the flask over a 4-hour period while maintaining the temperature at 100° C. Heating, agitation and oxygen addition were continued for a period of 4 additional hours. At the end of this time, the copper was completely reacted and a copper arsenate slurry was produced. Then a chromic acid solution was added to the copper arsenate slurry to give a 60% solution of a CCA-Type B formulation.

EXAMPLE 6

First 38.2 grams of copper turnings were placed in a 3-neck flask equipped with an agitator, reflux condenser, dropping funnel, and heating mantle. Then 71.0 grams of 75% arsenic acid were added and heating and agitation started. When the temperature reached 100° C., 35.6 grams of 70% $HNO_3$ were slowly added to the flask over a 4-hour period. Heating was continued for a total of 7 hours. At the end of this period, the copper was completely reacted and a slurry of copper arsenate was produced. The slurry was then mixed with a chromic acid solution to give a CCA-Type A formulation.

EXAMPLE 7

First 38.2 grams of copper turnings were placed in a 3-neck flask equipped with an agitator, reflux condenser, dropping funnel, fritted glass sparger, and heating mantle. Then 71.0 grams of 75% arsenic acid were added and heating and agitation started. Oxygen was bubbled into the mixture through the sparger and 8.0 grams of 70% $HNO_3$ were added dropwise to the flask over a 4-hour period while maintaining the temperature at 100° C. Heating, agitation and oxygen addition were continued for a period of 4 additional hours. At the end of this time, the copper was completely reacted and a copper arsenate slurry was produced. Then a chromic acid solution was added to the copper arsenate slurry to give a 60% solution of a CCA-Type A formulation.

EXAMPLE 8

This example illustrates a procedure for using $As_2O_3$ as a raw material. First 74.8 lbs. of crude $As_2O_3$ suitable for the manufacture of arsenic acid is charged into a reactor where it is reacted with 575 lbs. of $HNO_3$ having a sp. gr. of 1.35 or more. If desired, oxygen under pressure or traces of HCl can be used to aid the oxidation which is complete in 12–24 hours at 100° C. By use of a condenser, the unused $HNO_3$ is recovered at the end of the reaction and about 375 lbs. is recovered. Then 380 lbs. of copper wire scrap is then added, air or oxygen is sparged in under pressure, and 90 lbs. of nitric acid are added slowly over a period of 5 hours while maintaining heat and agitation at 100° C. When the nitric acid has all been added, oxygen addition, heat, and agitation are continued for 5 more hours. At this time the copper wire has completely reacted to produce a copper arsenate slurry. On addition of 123 lbs. of $CrO_3$ and 125 lbs. of water, there results 425 lbs. of a concentrate containing 61% active oxides in ratios conforming to the composition of CCA-Type C.

What is claimed is:

1. A method for making copper arsenate compositions which consist essentially of a slurry of water insoluble copper arsenate in an aqueous solution of soluble copper arsenate wherein the mole ratio of arsenic measured as $As_2O_5$ to copper measured as CuO of the overall copper arsenate composition is within the range of from about 0.3:1.0 to 0.9:1.0 and wherein the copper arsenate composition is soluble in chromic acid comprising reacting copper metal with arsenic acid in the presence of an oxidizing agent and an acid catalyst selected from the group consisting of nitric acid, hydrochloric acid and sulfuric acid wherein the copper and arsenic acid are proportioned to produce a copper arsenate composition having a mole ratio of $As_2O_5$ to CuO of from about 0.3:1.0 to 0.9:1.0.

2. A method as in claim 1 wherein the oxidizing agent is oxygen.

3. A method as in claim 1 wherein the catalyst is nitric acid.

4. A method as in claim 1 wherein a combination of nitric acid and oxygen is used.

* * * * *